(12) United States Patent
Liu et al.

(10) Patent No.: US 9,124,314 B2
(45) Date of Patent: Sep. 1, 2015

(54) METHOD AND DEVICE FOR DELIVERING SERVICE DATA

(75) Inventors: Wenhao Liu, Shenzhen (CN); Yanwen Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 99 days.

(21) Appl. No.: 13/808,950

(22) PCT Filed: Aug. 9, 2011

(86) PCT No.: PCT/CN2011/078167
§ 371 (c)(1),
(2), (4) Date: Jan. 8, 2013

(87) PCT Pub. No.: WO2012/055276
PCT Pub. Date: May 3, 2012

(65) Prior Publication Data
US 2013/0279428 A1    Oct. 24, 2013

(30) Foreign Application Priority Data

Oct. 28, 2010 (CN) .......................... 2010 1 0523856

(51) Int. Cl.
*H04B 7/02* (2006.01)
*H04B 7/04* (2006.01)
*H04B 7/06* (2006.01)

(52) U.S. Cl.
CPC .............. *H04B 7/024* (2013.01); *H04B 7/0456* (2013.01); *H04B 7/0617* (2013.01)

(58) Field of Classification Search
None
See application file for complete search history.

(56) References Cited

U.S. PATENT DOCUMENTS

2007/0155336 A1    7/2007  Nam et al.
2007/0248172 A1*  10/2007  Mehta et al. ................... 375/260

(Continued)

FOREIGN PATENT DOCUMENTS

CN    101159462 A    4/2008
CN    101662321 A    3/2010

(Continued)

OTHER PUBLICATIONS

Riichi Kudo et al ;"Spatial Domain Resource Sharing for Overlapping Cells"; Institute of Electronics, Information and Communication Engineers; The Institute of Electronics, Information and Communication Engineera; IEICE Technical Report A-P2010-33(Jun. 2010); 686439, Oct. 22, 2013; See pp. 7-13.

(Continued)

*Primary Examiner* — Dang Ton
*Assistant Examiner* — Ronald h Davis
(74) *Attorney, Agent, or Firm* — Ling Wu; Stephen Yang; Ling & Yang Intellectual Property

(57) ABSTRACT

A method and device for sending service data are provided in the present invention, so as to realize simplification of a precoding matrix calculation method. The method includes: a network side executing the following steps: calculating a value space matrix according to a signal channel matrix of a serving cell of a terminal; calculating a null space matrix according to an interference channel matrix of a coordinating cell of the terminal; projecting a vector of the value space matrix to a space on which a vector of the null space matrix is located to obtain a precoding matrix of the terminal; and sending the service data in the serving cell of the terminal according to the precoding matrix.

10 Claims, 4 Drawing Sheets

(56) References Cited

U.S. PATENT DOCUMENTS

| | | | |
|---|---|---|---|
| 2008/0075188 A1* | 3/2008 | Kowalski et al. | 375/267 |
| 2009/0323849 A1* | 12/2009 | Bala et al. | 375/267 |
| 2010/0008411 A1* | 1/2010 | Hansen et al. | 375/224 |
| 2010/0099428 A1* | 4/2010 | Bhushan et al. | 455/452.1 |
| 2010/0260138 A1* | 10/2010 | Liu et al. | 370/330 |
| 2010/0279729 A1* | 11/2010 | Hui et al. | 455/522 |
| 2011/0319092 A1* | 12/2011 | Kim et al. | 455/452.1 |
| 2012/0113897 A1* | 5/2012 | Thiele et al. | 370/328 |
| 2012/0157140 A1* | 6/2012 | Kim et al. | 455/501 |
| 2013/0034129 A1* | 2/2013 | Coldrey et al. | 375/211 |

FOREIGN PATENT DOCUMENTS

| | | |
|---|---|---|
| JP | 2004266818 A | 9/2004 |
| JP | 2007267376 A | 10/2007 |
| JP | 2008306713 A | 12/2008 |

OTHER PUBLICATIONS

"UE feedback for downlink CoMP"; ETRI, 7.5, Discussion/Decision; 3GPP TSG RAN WG1 Meeting #58bis; Miyazaki, Japan, Oct. 12-16, 2009, R1-094314; See pp. 1-6.

International Search Report for PCT/CN2011/078167 dated Oct. 25, 2011.

* cited by examiner

METHOD AND DEVICE FOR DELIVERING SERVICE DATA

TECHNICAL FIELD

The present invention relates to a Coordinate Multi-Point (CoMP) transmission technique in a multi-antenna communication system, and particularly, to a method and device for sending service data.

BACKGROUND OF THE RELATED ART

As a standard of the $4^{th}$ generation communication system (4G), the International Mobile Telecomadvanced (IMT-Advanced) raises higher requirements on system performance, especially on uplink and downlink spectrum efficiency. Coordinate multi-point transmission is a technique for improving transmission coverage area, cell edge service quality and throughput, as well as system throughput, and becomes an important technique for improving the spectrum utilization rate of a system, so it draws extensive attention. The so-called coordinate multi-point transmission means that multiple base stations perform coordinated transmission to serve one or more User Equipments (UEs).

The CoMP defined by the 3GPP includes 2 scenarios, one is multi-point Coordinated Scheduling and Coordinated Beamforming (CS/CB), that is, information is scheduled through interaction between adjacent nodes so that interference between transmission signals of various cells are coordinated; another one is multi-point joint processing, that is, multiple coordinating nodes provide services for target users unitedly through shared data, Channel State Information (CSI) information, scheduling information and so on. The coordinated multi-point transmission formed by combined beams belongs to the first CoMP scenario.

In the related art, when a precoding matrix is calculated, eigen vector resolution and matrix inversion are used, and these operations, especially the eigen vector resolution, are extremely time-consuming in the implementation process.

SUMMARY OF THE INVENTION

The technical problem to be solved by the present invention is to provide a method and device for sending service data, to simply a precoding matrix calculation method.

In order to solve the above technical problem, the present invention provides a method for sending service data, which comprises: a network side executing the following steps:

calculating a value space matrix according to a signal channel matrix of a serving cell of a terminal;

calculating a null space matrix according to an interference channel matrix of a coordinating cell of the terminal;

projecting a vector of the value space matrix to a space on which a vector of the null space matrix is located to obtain a precoding matrix of the terminal; and sending the service data in the serving cell of the terminal according to the precoding matrix.

Preferably, in the above method, the step of calculating a value space matrix according to a signal channel matrix of a serving cell of a terminal comprises:

solving an eigen value $\lambda$ of the signal channel matrix according to $|\lambda I - A| = 0$, wherein, I is a unit matrix, A is $H_S^H * H_S$ or $H_S * H_S^H$, $H_S$ is the signal channel matrix between terminal and the serving cell, and $H_S^H$ is a conjugate transpose matrix of the $H_S$;

obtaining an eigen vector y corresponding to each eigen value $\lambda$ according to $Ay = \lambda y$, wherein, the eigen vector y, namely a value space vector, is used for constituting the value space matrix.

Preferably, in the above method, the A is a square matrix with a smaller order among the $H_S^H * H_S$ and $H_S * H_S^H$.

Preferably, in the above method, calculating the null space matrix refers to solving homogeneous linear equations $H_I X = 0$ to obtain a null space vector x, the null space vector x is used for constituting the null space matrix, wherein, $H_I$ is the interference channel matrix of the terminal, and X is the null space matrix; if the terminal has multiple coordinating cells, the null space vector is calculated respectively according to the interference channel matrix of each coordinating cell, and the obtained null space vectors constitute the null space matrix jointly.

Preferably, in the above method, a coefficient matrix of the homogeneous linear equations is nTx*nRx, wherein, nTx is a number of transmitting antennas of the network side, and nRx is a number of receiving antennas of the terminal.

The present invention further provides a device for sending service data, which comprises:

a value space calculation module, configured to: calculate a value space matrix according to a signal channel matrix of a serving cell of a terminal;

a null space calculation module, configured to: calculate a null space matrix according to an interference channel matrix of a coordinating cell of the terminal;

a precoding matrix calculation module, configured to: project a vector of the value space matrix to a space on which a vector of the null space matrix is located to obtain a precoding matrix of the terminal; and a service data sending module, configured to: send the service data in the serving cell of the terminal according to the precoding matrix.

Preferably, in the above device, the value space calculation module comprises:

an eigen value calculation submodule, configured to: solve an eigen value $\lambda$ of the signal channel matrix according to $|\lambda I - A| = 0$, wherein, I is a unit matrix, A is $H_S^H * H_S$ or $H_S * H_S^H$, $H_S$ is the signal channel matrix between terminal and the serving cell, and $H_S^H$ is a conjugate transpose of the $H_S$;

a vector calculation submodule, configured to: obtain an eigen vector y corresponding to each eigen value $\lambda$ according to $Ay = \lambda y$, wherein, the eigen vector y, namely a value space vector, is used for constituting the value space matrix.

Preferably, in the above device, the A is a square matrix with a smaller order among the $H_S^H * H_S$ and $H_S * H_S^H$.

Preferably, in the above device, calculating null space refers to solving homogeneous linear equations $H_I X = 0$ to obtain a null space vector x, the null space vector x is used for constituting the null space matrix, wherein, $H_I$ is the interference channel matrix of the terminal, X is the null space matrix; if the terminal has multiple coordinating cells, the null space vector is calculated respectively according to the interference channel matrix of each coordinating cell, and the obtained null space vectors constitute the null space matrix jointly.

Preferably, in the above device, a coefficient matrix of the homogeneous linear equations is nTx*nRx, wherein, nTx is a number of transmitting antennas of a network side, and nRx is a number of receiving antennas of the terminal.

With the method and device of the present invention, by calculating the signal channel value space, interference channel null space and projection of the space vector, the precoding matrix is obtained, which simplifies the precoding matrix calculation method and enhances system performance.

PREFERRED EMBODIMENTS OF THE PRESENT INVENTION

In the present invention, a method for sending service data is given with respect to the first scenario of multi-point coordinated scheduling, and especially, a process of calculating a precoding matrix is improved. The currently discussed precoding matrix calculation method relates to eigen vector resolutions, and these algorithms can not satisfy implementation requirements on calculation accuracy and calculation time. In the examples of the present invention, the calculation for the precoding matrix is implemented by changing the algorithms of the precoding matrix and solving a high ordered equation and linear equations, which simplifies the precoding matrix calculation method and is especially applicable to edge users in low-speed movement.

The examples of the present invention will be described in detail below with reference to the accompanying drawings. It should be noted that the examples in the present invention and the characteristics in the examples can be combined with each other without conflict.

Figure 1:
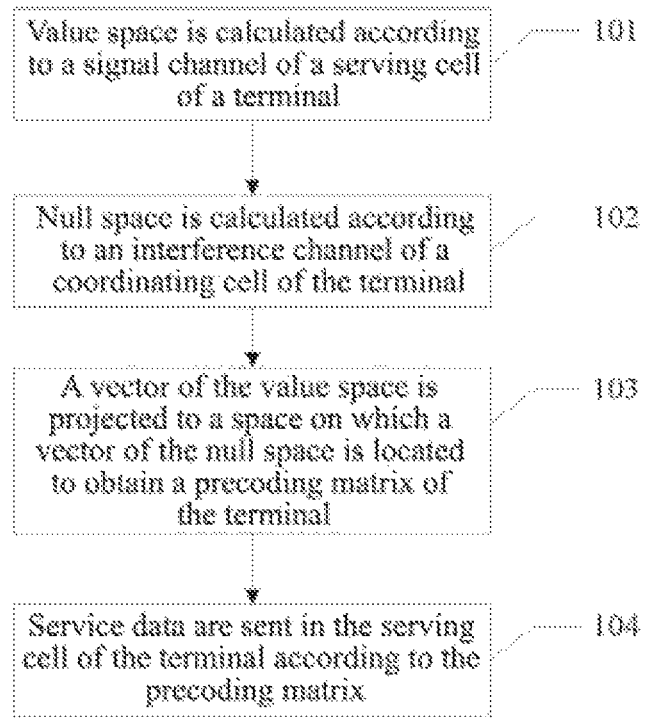
FIG. 1 is a schematic diagram of the method for sending service data according to an example of the present invention.

As shown in FIG. 1, in the method for sending service data provided by the example of the present invention, a network side executes the following steps.

In step 101, a value space is calculated according to a signal channel of a serving cell of a terminal.

The value space can have one or more value space vectors, and the number of the value space vectors is decided by a rank of a channel matrix.

A rank of a channel is the number of separable layers of a space channel, and the value of the rank is less than or equal to a smaller value among nTx and nRx, wherein, nTx is the number of transmitting antennas and nRx is the number of receiving antennas. The number of layers of the service data sent by the network side to the terminal must be less than or equal to the rank of the space channel, and the specific number of layers is determined by the network side according to the practical situation.

The value space is a direction with the strongest signal energy, and if a base station performs precoding according to the value space, strongest energy from the channels to target terminals can be guaranteed, but the interference to adjacent terminals are not considered in this case.

The step 101 further includes:

a) solving an eigen value $\lambda$ of the signal channel according to $|\lambda I - A| = 0$, wherein, A is $H_S^H * H_S$ or $H_S * H_S^H$, $H_S$ is a signal channel matrix between terminal and the serving cell, and $H_S^H$ is a conjugate transpose of the $H_S$; wherein, I is a unit matrix, a leading diagonal element is 1, and other elements are all 0.

Nonzero eigen values of the $H_S^H * H_S$ and $H_S * H_S^H$ are identical, and preferably, a square matrix with a smaller order among the $H_S^H * H_S$ and $H_S * H_S^H$ is selected as the A to solve the eigen value $\lambda$.

b) obtaining an eigen vector y corresponding to each eigen value $\lambda$ according to $Ay = \lambda y$, wherein, the feature vector y, namely a value space vector, is used for constituting the value space.

In step 102, a null space is calculated according to an interference channel of a coordinating cell of the terminal.

If an accurate null space can be calculated, it can be guaranteed that the interference of neighboring cells to a certain UE is zero, but it may be unable to guarantee a complete interference suppression due to problems such as quantization and so on in the practical process. Specifically, calculating the null space refers to solving homogeneous linear equations $H_I X = 0$ to obtain a null space vector x, the null space vector x is used for constituting the null space, wherein, $H_I$ is an interference channel matrix of the terminal (which refers to the interference channel matrix of coordinating cells to the terminal in the specific implementation), and X is the null space matrix.

A coefficient matrix of the homogeneous linear equations depends on the number of transmitting antennas of the network side and the number of receiving antennas of the terminal, and is represented as nTx*nRx, wherein, nTx is the number of transmitting antennas of the network side, and nRx is the number of receiving antennas of the terminal.

If the terminal has multiple coordinating cells, the null space vector is calculated respectively according to the interference channel of each coordinating cell, and the obtained null space vectors constitute the null space jointly.

In step 103, a vector of the value space is projected to a space on which a vector of the null space is located to obtain a precoding matrix of the terminal.

Figure 3:
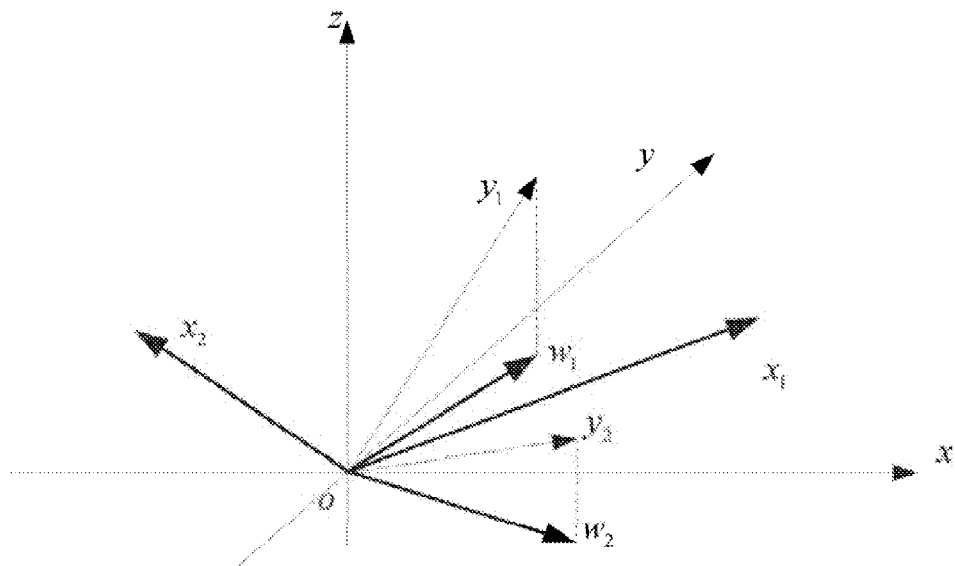
FIG. 3 is a schematic diagram of the principle for calculating a precoding matrix.

Since the precoding matrix is on the space expanded by the null space (as shown in FIG. 3), leak of signals is ideally "0", that is, the interference is suppressed as zero. In this case, the interference is suppressed to the minimum, and strongest signal power is guaranteed at the same time.

In step 104, the service data are sent in the serving cell of the terminal according to the precoding matrix.

Solution of eigen vectors of the channel matrix all boils down to solving the linear equations eventually and does not need any iterative operation, and thus has a fast arithmetic speed. Previous eigen vector resolutions and matrix inversions using the iterative algorithm operation require a time period of millisecond grade, but the overhead for processing resources can be reduced greatly after this method is adopted. In addition, since the precoding is the vector on the space on which the null space of the interference channel is located, the interference can be suppressed very well, which can enhance the throughput of the edge users effectively.

This method is applicable to multi-cell coordinate multi-point transmission and can support an antenna configuration of 8 transmitting antennas and 4 receiving antennas at most. This kind of method is especially suitable for edge users of low rank.

The present invention will be described below with reference to the accompanying drawings and application examples.

Application Example 1

Figure 2:
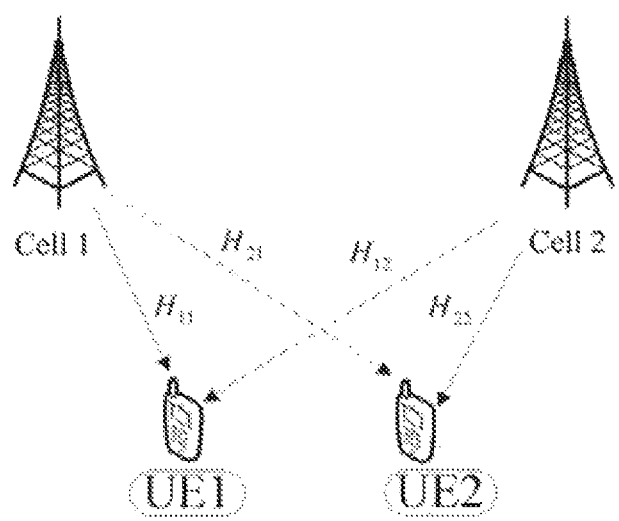
FIG. 2 is a schematic diagram of CoMP transmission between two cells.

FIG. 2 is a schematic diagram of two cells performing CoMP coordination. For a terminal UE1, its serving cell is a cell and cellist coordinating cell is a cell2, the space channel between the cell and UE1 is recorded as $H_{11}$, which is a signal channel, and the channel between the cell2 and UE1 is recorded as $H_{12}$ ($H_{12}$ is an interference channel from the cell2 to the UE1)

For a terminal UE2, its serving cell is the cell2 and its coordinating cell is the cell1, the space channel between the cell and UE2 is recorded as $H_{21}$ ($H_{21}$ is an interference channel from the cell to the UE2), and the space channel between the cell2 and UE2 is $H_{22}$.

If there are multiple coordinating cells, the representation method for signal channels and interference channels thereof is similar, and it is assumed that the rank of the channel matrix is 2 constantly. The following application examples are also the same.

A service data sending device (such as a base station 1) corresponding to the serving cell for sending service data to the terminal UE1 is taken as an example to describe the scheme of the present invention below.

Figure 4:
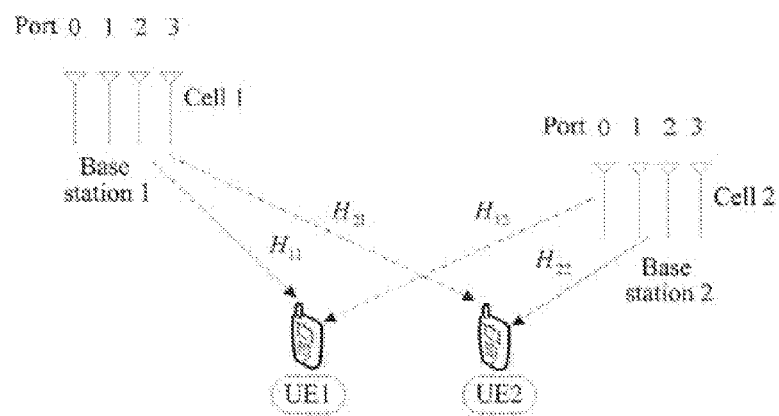
FIG. 4 is a schematic diagram corresponding to the application example 1 of the present invention.

In the application example, the number of transmitting antennas is 4, the number of receiving antennas is 2, two cells (cell and cell2, wherein the cell is a serving cell of a UE) participate in the CoMP coordination, as shown in FIG. 4, and the base station 1 uses two transmission layers to send the service data to the UE. The specific steps are as follows.

In step 401, the base station 1 calculates value space, which is recorded as [y1 y2], according to H11 in accordance with the foresaid method, wherein, y1 and y2 are value space vectors.

In step 402, the base station 1 solves homogeneous linear equations with a coefficient matrix of 4*2 according to H21 in accordance with the foresaid method to obtain a null space, which is recorded as [x1 x2], wherein, x1 and x2 are null space vectors.

In step 403, the base station 1 projects the value vectors to a space on which the null vectors are located to obtain a precoding matrix, which is recorded as [w1 w2], and also recorded as W1; wherein:

$$w_1 = \langle y_1, x_1 \rangle \frac{x_1}{\|x_1\|_2^2} + \langle y_1, x_2 \rangle \frac{x_2}{\|x_2\|_2^2},$$

$$w_2 = \langle y_2, x_1 \rangle \frac{x_1}{\|x_1\|_2^2} + \langle y_2, x_2 \rangle \frac{x_2}{\|x_2\|_2^2}.$$

In step 404, the base station 1 uses the W1 as the precoding matrix to send the service data to the UE in the cell1.

Application Example 2

Figure 5:
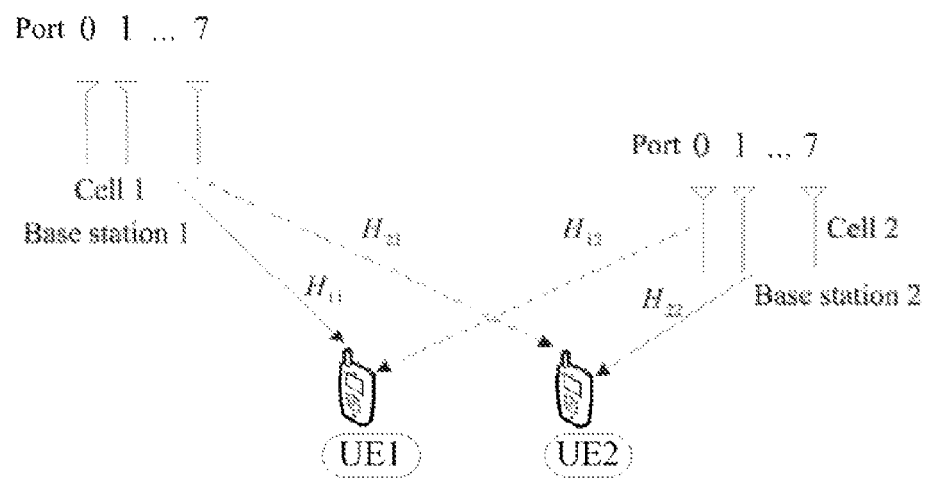
FIG. 5 is a schematic diagram corresponding to the application example 2 of the present invention.

In the application example, the number of transmitting antennas is 8, the number of receiving antennas is 2, two cells (a cell and a cell2, wherein the cell is a serving cell of a UE) participate in CoMP coordination, as shown in FIG. 5, and a base station 1 uses two transmission layers to send service data to the UE. The specific steps are as follows.

In step 501, the base station 1 calculates value space vectors [y1 y2] according to H11, and the eigen value solution here is still the solution of a quadratic equation.

In step 502, the base station 1 solves homogeneous linear equations with a coefficient matrix of 8*2 according to H21 to obtain null space vectors [x1 x2].

In step 503, the final precoding matrix of the cell is calculated according to the method of the formula 2, and the precoding matrix is recorded as W1.

In step 504, the base station 1 uses the W1 as the precoding matrix to send the service data to the UE in the cell1.

Application Example 3

Figure 6:
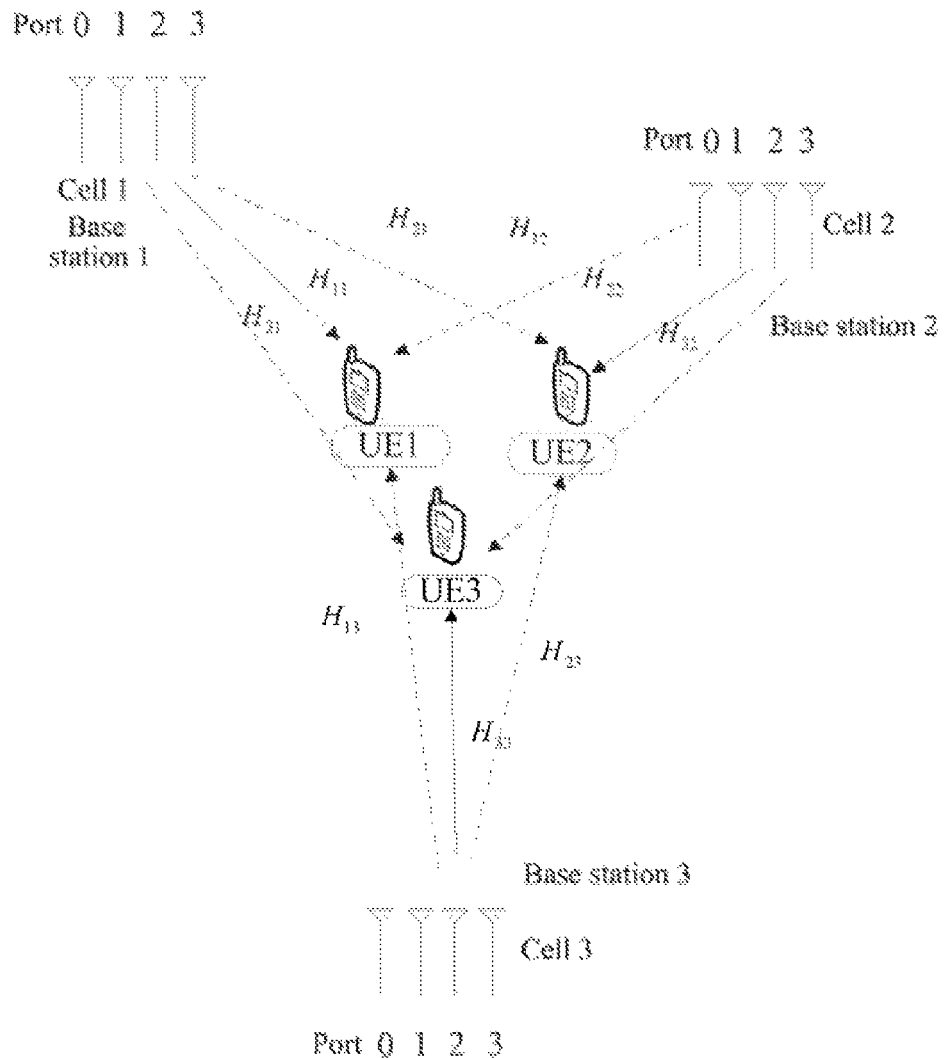
FIG. 6 is a schematic diagram corresponding to the application example 3 of the present invention.

In the application example, the number of transmitting antennas is 4, the number of receiving antennas is 2, three cells (a cell1, a cell2 and a cell3, wherein the cell1 is a serving cell of a UE) participate in CoMP coordination, as shown in FIG. 6, and a base station 1 uses two transmission layers to send service data to the UE. The specific steps are as follows.

In step 601, the base station 1 calculates value space vectors [y1 y2] according to H11, and the eigen value solution here is still the solution of a quadratic equation.

In step 602, the base station 1 solves homogeneous linear equations with a coefficient matrix of 8*2 according to H21 to obtain null space vectors [x1 x2].

In step 603, the base station 1 solves homogeneous linear equations with a coefficient matrix of 8*2 according to H31 to obtain null space vectors [x3 x4].

In step 604, the null spaces of the H21 and H31 are combined to serve as one null space, and a final precoding matrix of the cell is calculated according to the following formulas:

$$w_1 = \langle y_1, x_1 \rangle \frac{x_1}{\|x_1\|_2^2} + \langle y_1, x_2 \rangle \frac{x_2}{\|x_2\|_2^2} + \langle y_1, x_3 \rangle \frac{x_3}{\|x_3\|_2^2} + \langle y_1, x_4 \rangle \frac{x_4}{\|x_4\|_2^2}$$

$$w_2 = \langle y_2, x_1 \rangle \frac{x_1}{\|x_1\|_2^2} + \langle y_2, x_2 \rangle \frac{x_2}{\|x_2\|_2^2} + \langle y_2, x_3 \rangle \frac{x_3}{\|x_3\|_2^2} + \langle y_2, x_4 \rangle \frac{x_4}{\|x_4\|_2^2}$$

$[w_1\ w_2]$ is recorded as $W1$.

In step 605, the base station 1 uses the W1 as the precoding matrix to send the service data to the UE in the cell1.

Figure 7:
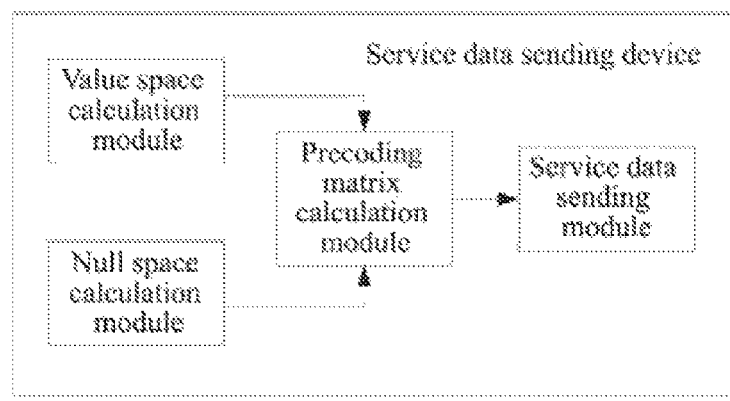
FIG. 7 is a schematic diagram of the module structure corresponding to the device for sending service data according to the present invention.

In order to implement the above method, the embodiment of the present invention further provides a device for sending service data, and as shown in FIG. 7, the device includes a value space calculation module, a null space calculation module, a precoding matrix calculation module and a service data sending module, wherein:

the value space calculation module is configured to: calculate a value space according to a signal channel of a serving cell of a terminal;

the value space calculation module specifically includes:

an eigen value calculation submodule, configured to: solve an eigen value $\lambda$ of the signal channel according to $|\lambda I - A| = 0$, wherein, A is $H_S^H * H_S$ or $H_S * H_S^H$, $H_S$ is a signal channel matrix between terminal and the serving cell, and $H_S^H$ is a conjugate transpose of the $H_S$;

a vector calculation submodule, configured to: obtain an eigen vector y corresponding to each eigen value $\lambda$ according to $Ay = \lambda y$, wherein, the eigen vector y, namely a value space vector, is used for constituting the value space.

Preferably, a square matrix with a smaller order among the $H_S^H * H_S$ and $H_S * H_S^H$ is selected as the A to calculate the eigen value.

The null space calculation module is configured to: calculate a null space according to an interference channel of a coordinating cell of the terminal;

the precoding matrix calculation module is configured to: project a vector of the value space to a space on which a vector of the null space is located to obtain a precoding matrix of the terminal;

calculating the null space refers to solving homogeneous linear equations $H_I X = 0$ to obtain a null space vector x, the null space vector x is used for constituting the null space, wherein, $H_I$ is an interference channel matrix of the terminal, and X is a null space matrix. If the terminal has multiple coordinating cells, the null space vector is calculated respectively according to the interference channel of each coordinating cell, and the obtained null space vectors constitute the null space jointly.

The coefficient matrix of the homogeneous linear equations is nTx*nRx, wherein, nTx is the number of transmitting antennas of a network side, and nRx is the number of receiving antennas of the terminal.

The service data sending module is configured to: send the service data in the serving cell of the terminal according to the precoding matrix.

In a case where two cells participate in coordination, it is assumed that the number of transmitting antennas of a base station is 4, the number of receiving antennas of a UE is 2, and the rank of space channels is 2.

In the related art, the method for calculating the precoding matrix according to the principle of maximum signal-to-leakage ratio is:

$$w_1 = \underset{L_1}{eig}\{(H_{12}^H H_{12}/N_2 + \alpha I)^{-1} H_{11}^H H_{11}\}$$

$$w_2 = \underset{L_2}{eig}\{(H_{21}^H H_{21}/N_1 + \alpha I)^{-1} H_{22}^H H_{22}\}$$

wherein, $w_1$ is a first layer precoding vector, $w_2$ is a second layer precoding vector, and eigen vector resolution and matrix inversion are used in the above formulas when the precoding matrix is calculated. These operations, especially the eigen vector resolution, are extremely time-consuming in the implementation process as the resolution operation of the eigen vector is implemented by way of iteration.

Compared with the related art, the method provided by the embodiment of the present invention does not need an iterative algorithm, and can be implemented only by solving an extra-high ordered equation and linear equations, which simplifies the precoding matrix calculation method and enhances system performance.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or more integrated circuits. Correspondingly, each module/unit in the above examples can be implemented in a form of hardware, and also can be implemented in a form of software function module. The present invention is not limited to any combination of hardware and software in a specific form.

INDUSTRIAL APPLICABILITY

The present invention provides a method and device for sending service data, a value space is calculated according to a signal channel of a serving cell of a terminal, a null space is calculated according to an interference channel of a coordinating cell of the terminal, a vector of the value space is projected to a space on which a vector of the null space is located to obtain a precoding matrix of the terminal, and then the service data are sent in the serving cell of the terminal according to the precoding matrix, thereby simplifying the precoding matrix calculation method.

With the method and device of the present invention, a precoding matrix is obtained by calculating the signal channel value space, interference channel null space and projection of space vector, which simplifies the precoding matrix calculation method and enhances system performance.

What is claimed is:
1. A method for sending service data, comprising:
calculating, by a network side device, a value space matrix according to a signal channel matrix of a serving cell of a terminal;
calculating, by the network side device, a null space matrix according to an interference channel matrix of a coordinating cell of the terminal;
projecting, by the network side device, a vector of the value space matrix to a space on which a vector of the null space matrix is located to obtain a precoding matrix of the terminal; and
sending, by the network side device, the service data in the serving cell of the terminal according to the precoding matrix;
wherein the value space matrix is recorded as $[y_1, y_2, \ldots y_n]$, the null space matrix is recorded as $[x_1, x_2, \ldots x_m]$, and the precoding matrix is recorded as $[w_1, w_2, \ldots w_n]$,

$$w_1 = \langle y_1, x_1, \rangle \frac{x_1}{\|x_1\|_2^2} + \langle y_1\ x_2 \rangle \frac{x_2}{\|x_2\|_2^2} + \ldots + \langle y_1\ x_m \rangle \frac{x_m}{\|x_m\|_2^2}$$

$$w_2 = \langle y_2, x_1, \rangle \frac{x_1}{\|x_1\|_2^2} + \langle y_2\ x_2 \rangle \frac{x_2}{\|x_2\|_2^2} + \ldots + \langle y_2\ x_m \rangle \frac{x_m}{\|x_m\|_2^2}$$

$$\vdots$$

$$w_n = \langle y_n, x_1, \rangle \frac{x_1}{\|x_1\|_2^2} + \langle y_n\ x_2 \rangle \frac{x_2}{\|x_2\|_2^2} + \ldots + \langle y_n\ x_m \rangle \frac{x_m}{\|x_m\|_2^2}$$

wherein $m=n \times (c-1)$, c is a total number of cells participating in a CoMP, and n is a rank of the signal channel matrix.

2. The method according to claim 1, wherein, the step of calculating, by a network side device, a value space matrix according to a signal channel matrix of a serving cell of a terminal comprises:
solving, by a network side device, an eigen value $\lambda$ of the signal channel matrix according to $|\lambda I - A|=0$, wherein, I is a unit matrix, A is $H_S^H*H_S$ or $H_S*H_S^H$, $H_S$ is the signal channel matrix between terminal and the serving cell, and $H_S^H$ is a conjugate transpose matrix of the $H_S$;
obtaining, by a network side device, an eigen vector y corresponding to each eigen value $\lambda$ according to $Ay=\lambda y$, wherein, the eigen vector y, namely a value space vector, is used for constituting the value space matrix.

3. The method according to claim 2, wherein: the A is a square matrix with a small order in the $H_S^H*H_S$ and $H_S*H_S^H$.

4. The method according to claim 1, wherein: calculating, by a network side device, the null space matrix refers to solving, by a network side device, homogeneous linear equations $H_I X=0$ to obtain a null space vector x, the null space vector x is used for constituting the null space matrix, wherein, $H_I$ is the interference channel matrix of the terminal, and X is the null space matrix; if the terminal has multiple coordinating cells, the null space vectors are calculated respectively according to the interference channel matrix of each coordinating cell, and obtained null space vectors constitute the null space matrix jointly.

5. The method according to claim 4, wherein: a coefficient matrix of the homogeneous linear equations is nTx*nRx, wherein, nTx is a number of transmitting antennas of the network side, and nRx is a number of receiving antennas of the terminal.

6. A device for sending service data, comprising a processor, and a memory storing instructions that, when executed, cause the device to:
- calculate a value space matrix according to a signal channel matrix of a serving cell of a terminal;
- calculate a null space matrix according to an interference channel matrix of a coordinating cell of the terminal;
- project a vector of the value space matrix to a space on which a vector of the null space matrix is located to obtain a precoding matrix of the terminal; and
- send the service data in the serving cell of the terminal according to the precoding matrix;

wherein the value space matrix is recorded as $[y_1, y_2, \ldots y_n]$, the null space matrix is recorded as $[x_1, x_2, \ldots x_m]$, and the precoding matrix is recorded as $[w_1, w_2, \ldots w_n]$, $$w_1 = \langle y_1, x_1 \rangle \frac{x_1}{\|x_1\|_2^2} + \langle y_1\ x_2 \rangle \frac{x_2}{\|x_2\|_2^2} + \ldots + \langle y_1\ x_m \rangle \frac{x_m}{\|x_m\|_2^2}$$

$$w_2 = \langle y_2, x_1 \rangle \frac{x_1}{\|x_1\|_2^2} + \langle y_2\ x_2 \rangle \frac{x_2}{\|x_2\|_2^2} + \ldots + \langle y_2\ x_m \rangle \frac{x_m}{\|x_m\|_2^2}$$

$$\vdots$$

$$w_n = \langle y_n, x_1 \rangle \frac{x_1}{\|x_1\|_2^2} + \langle y_n\ x_2 \rangle \frac{x_2}{\|x_2\|_2^2} + \ldots + \langle y_n\ x_m \rangle \frac{x_m}{\|x_m\|_2^2}$$

wherein $m = n \times (c-1)$, c is a total number of cells participating in a CoMP, and n is a rank of the signal channel matrix.

7. The device according to claim 6, wherein, the instructions cause the device to:
- solve an eigen value $\lambda$ of the signal channel matrix according to $|\lambda I - A| = 0$, wherein, I is a unit matrix, A is $H_S^H * H_S$ or $H_S * H_S^H$, $H_S$ is the signal channel matrix between the terminal and the serving cell, and $H_S^H$ is a conjugate transpose of the $H_S$;
- obtain an eigen vector y corresponding to each eigen value $\lambda$ according to $Ay = \lambda y$, wherein, the eigen vector y, namely a value space vector, is used for constituting the value space matrix.

8. The device according to claim 7, wherein: the A is a square matrix with a smaller order among the $H_S^H * H_S$ and $H_S * H_S^H$.

9. The device according to claim 6, wherein: calculating null space refers to solving homogeneous linear equations $H_I X = 0$ to obtain a null space vector x, the null space vector x is used for constituting the null space matrix, wherein, $H_I$ is the interference channel matrix of the terminal, and X is the null space matrix; if the terminal has multiple coordinating cells, the null space vector is calculated respectively according to the interference channel matrix of each coordinating cell, and obtained null space vectors constitute the null space matrix jointly.

10. The device according to claim 9, wherein: a coefficient matrix of the homogeneous linear equations is nTx*nRx, wherein, nTx is a number of transmitting antennas of a network side, and nRx is a number of receiving antennas of the terminal.

* * * * *